Figure 3:
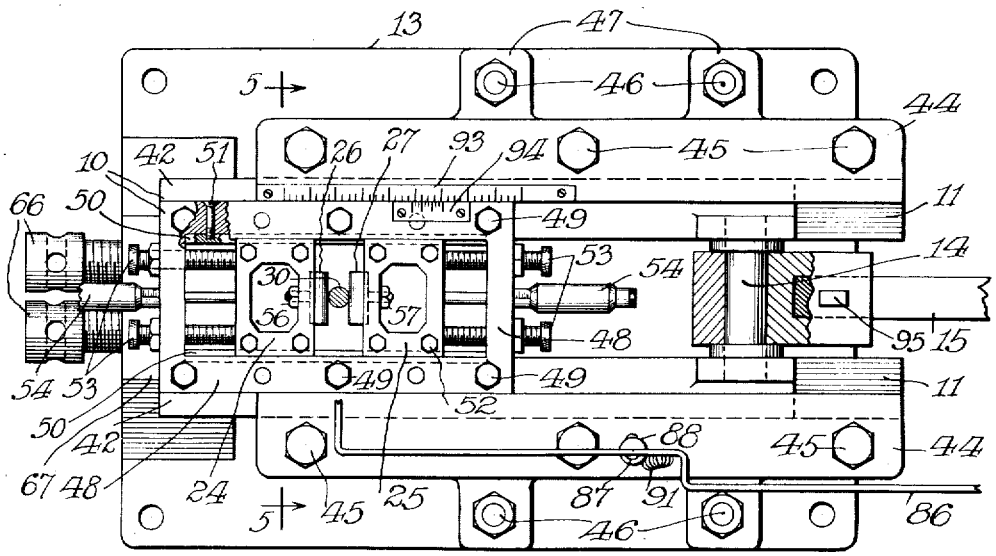

J. B. KOMMERS.
REPEATED STRESS TESTING MACHINE.
APPLICATION FILED AUG. 5, 1914.
1,163,830.   Patented Dec. 14, 1915.
3 SHEETS—SHEET 1.
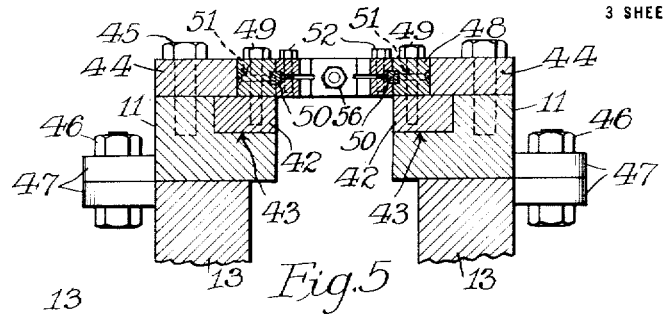
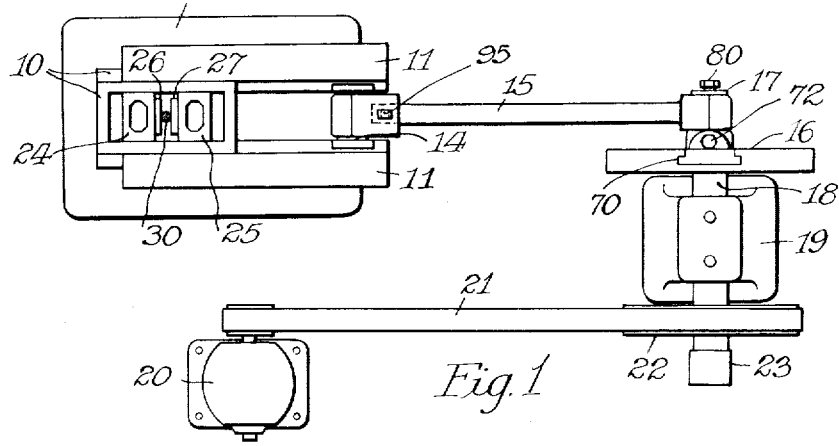
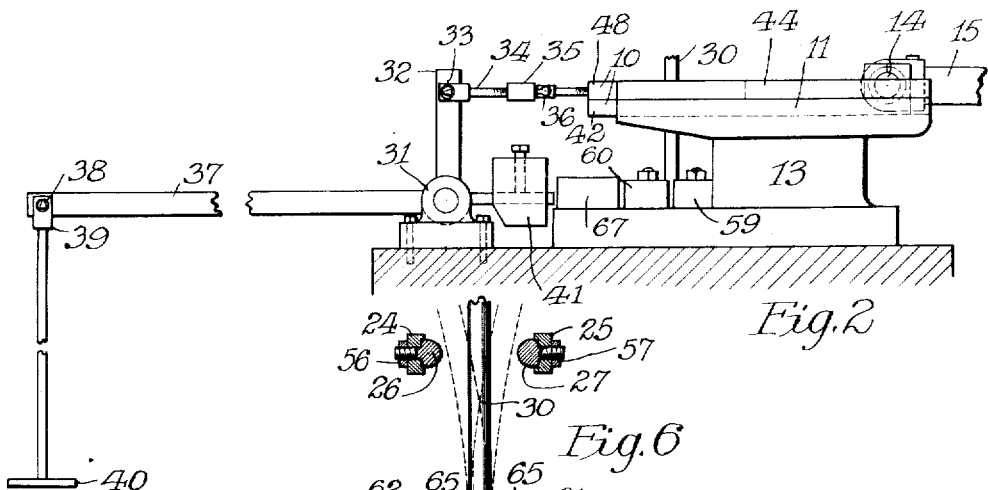
Witnesses:
Cameron A. Whitsett
Leonard W. Novander
Inventor
Jesse B. Kommers
By Brown, Hanson & Boettcher
Attorneys

J. B. KOMMERS.
REPEATED STRESS TESTING MACHINE.
APPLICATION FILED AUG. 5, 1914.

1,163,830.

Patented Dec. 14, 1915.
3 SHEETS—SHEET 2.

Witnesses:
Leonard W. Novander
Cameron A. Whitsett

Inventor
Jesse B. Kommers
By Brown, Hanson & Boettcher
Attorneys

J. B. KOMMERS.
REPEATED STRESS TESTING MACHINE.
APPLICATION FILED AUG. 5, 1914.
1,163,830.
Patented Dec. 14, 1915.
3 SHEETS—SHEET 3.
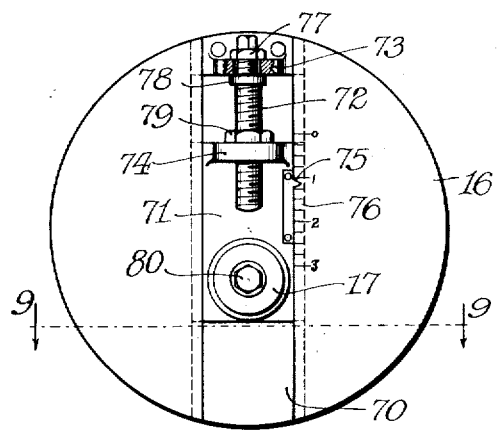
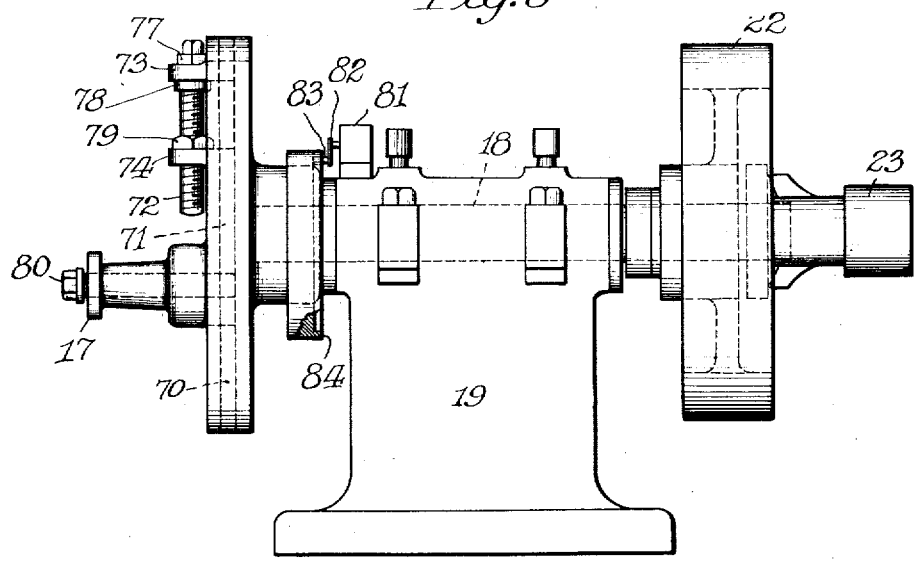
Witnesses
Cameron A. Whitsett
Leonard W. Novander
Inventor
Jesse B. Kommers
By Brown, Hanson & Boettcher
Attorneys

UNITED STATES PATENT OFFICE.

JESSE B. KOMMERS, OF MADISON, WISCONSIN.

REPEATED-STRESS-TESTING MACHINE.

1,163,830.  Specification of Letters Patent.  Patented Dec. 14, 1915.

Application filed August 5, 1914. Serial No. 855,096.

*To all whom it may concern:*

Be it known that I, JESSE B. KOMMERS, a citizen of the United States, residing at Madison, in the county of Dane and State of Wisconsin, have invented certain new and useful Improvements in Repeated-Stress-Testing Machines, of which the following is a full, clear, concise, and exact description, reference being had to the accompanying drawings, forming a part of this specification.

The subject-matter of the present invention is a repeated stress testing machine. In testing specimens of steel and the like, it is customary to subject the specimen to repeated stresses of a definite character and to compare the qualities of various specimens by the ratio of the number of the stresses which the specimens can withstand before failure. It is also customary to compare the efficacy of the various heat treatments upon a given material by the ability of specimens to withstand repeated stresses. In the machine which is the subject-matter of the present invention, the specimen may be bent only in one direction or alternately in opposite directions until failure occurs. In certain classes of tests, it is desirable to deliver a hammer blow to the specimen in bending the same. A machine built in accordance with the teachings of my invention is capable of delivering such a blow when testing a specimen. Means is also provided for recording automatically the number of stresses to which the specimen is subjected before failure thereof occurs.

The object of the present invention is to provide an improved testing machine for subjecting a specimen to repeated stresses.

A further object is to provide automatic means for registering the number of stresses to which the specimen is subjected before failure of the specimen occurs.

A still further object is to provide means for accurately determining the amount of flexure to which the specimen is subjected and to determine the load corresponding to any such deflection, and a further object is to improve and simplify the construction of testing machines.

Figure 4:
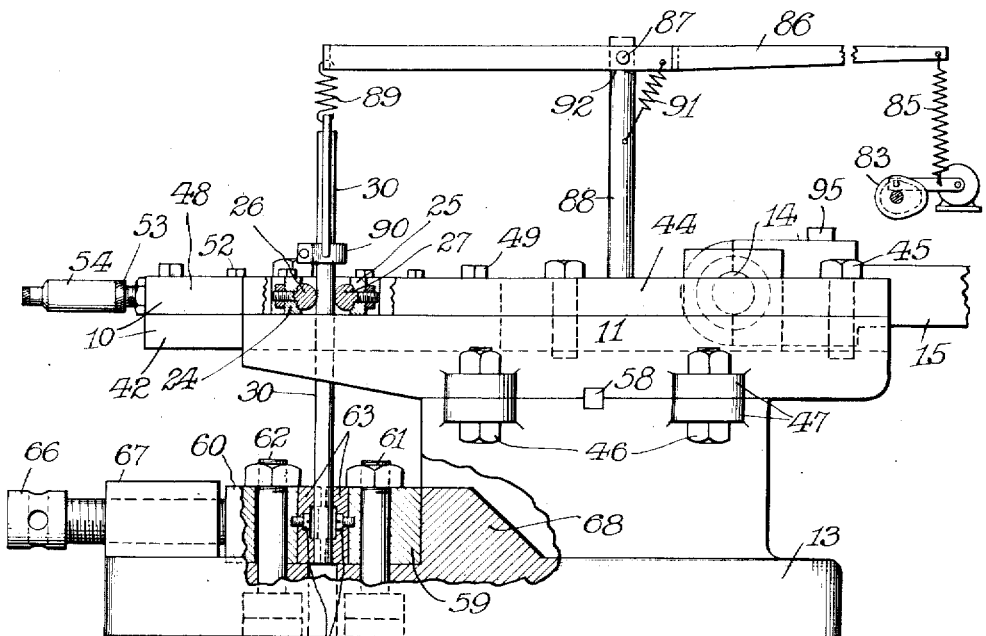

In the drawings accompanying and forming a part of this specification, Figure 1 is a general plan view of the main operating parts of the machine when in position to test a specimen by repeated alternate stresses; Fig. 2 is an elevation of the machine when arranged to determine the load corresponding to a given deflection of the specimen; Fig. 3 is a plan view, with parts broken away, of the slider mechanism; Fig. 4 is an elevation of the same; Fig. 5 is a view of a cross-section on the line 5—5 of Fig. 3; Fig. 6 is a fragmentary detail view, showing the gripping mechanism and the impact jaws; Fig. 7 is an elevation of the jack shaft and crank disk; Fig. 8 is a front view of the crank disk, showing the mechanism for adjusting the throw of the crank; and Fig. 9 is a cross-section of the crank disk on the line 9—9 of Fig. 8.

In Fig. 1, I have shown a cross-head or slider 10, mounted in the ways, 11, upon the base 13. This slider is operated by means of a wrist pin 14, through a connecting rod 15 and a disk crank 16, having a crank pin 17 of variable throw. The crank disk 16 is mounted on a shaft 18, having bearings in the pedestal 19. The shaft 18 is driven by an electric or other motor 20, as by means of the belt 21 and driving pulley 22, which may be connected to the shaft 18 by means of the clutch mechanism 23. Upon the slider 10, adjustable blocks 24 and 25 are mounted. Impact jaws 26 and 27 are mounted on the blocks 24 and 25 and serve to flex the specimen 30, which extends between them, when the slider 10 is moved by rotation of the crank disk 16.

In Fig. 2, I have illustrated the slider 10 as connected to the stationary deflection mechanism for determining the load necessary to produce a given deflection of the specimen. This mechanism consists of a bell crank lever 31, having its shorter arm 32 connected, by means of a knife-edge 33 and yoke 34, to the slider 10. Adjusting means, such as the turn buckle 35, may be provided for insuring the proper relation of the bell crank lever and the slider. The flexible coupling 36 may also be introduced into the connection to prevent flexing of the same. The long arm 37 of the bell crank lever is provided with a knife-edge 38 and yoke 39, to which a platform 40 may be attached for the suspension of suitable weights to produce the proper deflection of the specimen 30. In order to obviate the necessity for computing the weight of the lever arm, I employ a counterbalance 41 for maintaining a balance of the parts. By this means, I am able to read directly the load required to produce a given deflection.

The slider mechanism and associated parts is shown in detail in Figs. 3 to 6 inclusive. The slider 10 consists of bearing members 42 (see Fig. 5) to which is connected the crank pin 14 for imparting motion thereto. The slides 42 fit accurately into grooves 43 formed in the ways 11, the slides 42 being secured in said grooves by means of the guide plates 44, which are clamped to the ways 11 by means of the bolts 45. The ways 11 are formed separately from the base 13. but are clamped to said base by means of bolts 46 extending through ears 47 formed upon the ways 11 and base 13. A rectangular frame member 48 is clamped by means of bolts 49 to the slides 42. This frame bears rectangular keys 50 let into a groove in the sides of said frame and secured therein by means of the screws 51, shown in Figs. 3 and 5. The blocks 24 and 25 have rectangular grooves in the edges thereof, fitting over the projecting portion of the guide keys 50. The blocks 24 and 25 are slit, as indicated in Fig. 5, and are provided with clamping bolts 52 for drawing the edges of the blocks together to grip the guiding keys 50 in order to maintain the blocks 24 and 25 in a predetermined position during the adjustment. The blocks are held against outward movement by means of the bolts 52, which bolts may be locked by suitable jam nuts. Micrometers 54 and 55 are provided for obtaining an accurate adjustment of the blocks 24 and 25. These blocks have secured on their inner faces. by means of the bolts 56 and 57, the hardened steel blocks 26 and 27, which form impact or hammer jaws for engaging the specimen 30 to be tested.

Figs. 4 and 6 illustrate the clamping means for gripping the specimen rigidly in the machine. A pair of clamping blocks 59 and 60 is clamped to the base 13 by means of bolts 61 and 62 passing through the base and through the blocks. These blocks are provided with hardened steel clamping jaws 63, which are fastened to the blocks by means of the screws 64. These jaws are recessed at 65 for a purpose to be explained later. A pair of bolts 66 is threaded through the boss 67 to force the jaws together to grip the specimen 30. An abutment 68 is provided for the block 59 in order to allow secure clamping of the blocks 59, 60 by means of bolts 66.

In Figs. 7, 8 and 9. I have illustrated the crank shaft and an adjustable crank disk for securing a variable throw of the crosshead or slider 10. The crank disk 16 is slotted diametrically by an undercut groove 70 in the shape of a T-slot (see Fig. 9). A slide 71, bearing the crank pin 17. is fitted closely in said groove. The slide 71 and pin 17 are moved in the guide by means of the bolt 72 which passes through the stationary lug 73 and threads into a lug 74 on the slide 71. A pointer 75 is attached to the slide and indicates on the scale 76 the distance from the center of the disk 16 to the center of the pin 17. In other words, it indicates one-half the throw of the crank. A lock nut 77 clamps the bolt 72, by means of the collar 78, firmly against the lug 73, and a lock nut 79 may be employed for locking the bolt 72 in the lug 74. The pin 17 is threaded axially for the reception of a set screw 80 bearing against the bottom of the slot 70.

The means for counting the number of strokes made by the slider is shown in Figs. 3, 4 and 7. A Veeder counter 81 has a crank 82 provided with a pin 83. A spring 85 normally holds the pin 83 in engagement with the inner surface of the eccentric 84. Upon failure of the specimen, the tension of the spring 85 is automatically released and the operation of the counter is halted. I secure this effect by means of the following apparatus: The spring 85 is normally held under tension by means of a lever 86, pivoted at 87 on a standard 88 mounted on a guide-plate 44. The opposite end of the lever 86 is attached, by means of the spring 89, to the clamp 90, which clamp is fastened to the specimen 30. A spring 91 attached to the lever 86 and to the post 88, tends to push the lever 86 in such a manner as to throw the counter mechanism out of action. The spring 89 normally holds the lever 86 against the abutment 92 on the post 88, so as to hold the lever in a definite position so long as the specimen is intact. Upon failure of the specimen, the broken end thereof rises and, under the influence of the spring 91, the lever 86 is tilted in a clockwise direction and the pin 83 drops down out of the influence of the eccentric.

The adjustment and operation of the machine are as follows: Assume that it is desired to test a specimen by alternate flexures. The specimen is first clamped in the jaws 63 by means of the bolts 66. The bolts 61, 62 are tightened to hold the parts in position and the slide 71, bearing the crank pin 17, is adjusted in the crank disk 16 to obtain a definite throw of the slider 10. The amount of eccentricity of the pin 17 on the crank disk 16 is half of the throw of the slider. This adjustment is secured by turning the bolt 72 until the proper eccentricity has been obtained. The bolt 80 is then tightened to hold the slide 71 in the slot 70 and, thereafter, the lock nuts 77 and 79 are tightened. If it is desired to deliver a blow to the specimen before the same is to be deflected, the blocks 24 and 25 are separated the proper distance to secure such a result.

As previously indicated, it is possible to secure by this machine a deflection without a blow, either repeatedly in the same direction or alternately in opposite directions, or to deliver a blow before each of said operations, the desired result being secured by a proper adjustment of the blocks 24 and 25 so as to give greater or less loss of motion when the slider 10 is thrown to and fro. When the impact jaws 26 and 27 engage the specimen 30, no blow is delivered, as the lost motion is zero. In this case, the deflection will be equal to half the throw of the crank and slider. By allowing lost motion a greater blow will be struck with such deflection, but the same deflection can be secured by increasing the throw of the crank by the adjusting means shown in Figs. 7, 8 and 9.

Suppose a specimen is to be tested by a three-quarter inch impact and a deflection of one-quarter inch, the specimen being three-eighths inch round material. To obtain this effect, the slider 10 must have a half-stroke of three-eighths inch, plus one-quarter inch or five-eighths inch. The crank pin 17 is first set for this half-stroke and then the full stroke is accurately measured by means of the scale 93 and the vernier 94, shown in Fig. 3, upon the side of the plate 44 and the frame 48, respectively. When the exact stroke has been obtained, the slider 10 is set at the middle of its stroke by means of the scale and vernier. A perfectly straight standard three-eighths inch specimen is then fastened in the gripping blocks 63 and the blocks 24 and 25 are loosened upon their slides, so as to be freely adjustable by means of the screws 52 and 53. The block 24 or 25 is then moved until its impact jaw is brought into contact with the specimen. The contact of the block may be determined by means of the quick adjusting micrometer 54, which is preferably provided with a yielding or ratchet pressure mechanism, as is well-known in the art. Assume that the micrometer reads 0.125 inch. The micrometer is then moved backward three-eighths of an inch, making a total reading thereupon of 0.50 inch. The screws 53 are turned back until the block is just in contact with the micrometer. At this point, the block is clamped in place by means of the screws 52. This clamps the block against the guide and, thereafter, the screws 53 are brought against the block and set by means of the lock nuts. The same operation is performed for both blocks 24 and 25, so that the setting shall be accurate. The standard bar is removed and the desired specimen inserted in place thereof. The clamp 90 for governing the counting mechanism is secured to the specimen and the motor 20 is started. As soon as full speed is attained, the clutch mechanism 23 is operated and the machine operates to test the specimen 30. Upon failure of the specimen, the counting mechanism is automatically rendered inactive and the testing machine may be stopped by throwing out the clutch mechanism 23.

It is noted that the frame of the machine is split, as shown in Figs. 4 and 5, and secured by means of the bolts and lugs 46, 47, and endwise motion is prevented by means of the key 58. By this construction, it is possible to interpose a block of definite strength between the base 13 and the ways 11, so as to test a greater free length of specimen. It is noted that the gripping jaws 63 are raised, as shown more particularly in Figs. 4 and 6. This is to serve as a marking means for the specimen to indicate that the same has been gripped in the jaws for testing purposes. It is also possible to tell by the mark of the jaws upon the specimen whether any slipping of the specimen has occurred during the test. This is a valuable aid in determining the sufficiency of the test.

If it is desired to determine the amount of load required to produce a given deflection, the connecting rod 15 is disconnected from the crank pin 17. This may be effected by withdrawing the key 95, shown in Fig. 1. The bell crank lever 31 is attached to the slider 10 and, by proper adjustment of the turn-buckle 35 and by placing suitable weights upon the platform 40, the specimen is deflected by the amount which it is desired to produce. This deflection may be read by means of the scale and vernier 93, 94, shown in Fig. 3. The load may be readily determined inasmuch as the relation of the lever arms 32 and 37 is fixed.

From the above description, it can be seen that I have provided a testing machine embodying a number of important and useful features, suitable for obtaining comparisons between various specimens. Any desired form of specimen may be tested by changing the gripping jaws 63. Among other advantages of the machine the following may be pointed out: The parts are adjustable, so that the stroke may be quickly changed and, by means of the scale and vernier, accurate measurements may be made; the adjustment for setting the hammer or impact dies is very accurate and readily manipulated; the machine may be set to test specimens of various lengths, as well as various shapes; the amount of hammer blow or impact may be varied for a given deflection and, reversely, the deflection may be varied for a given impact; the load corresponding to any deflection may be accurately determined and, from this, the bending moment to which the specimen has been subjected may readily be calculated; the counting mechanism automatically records the number of working strokes or flexures, and the counter ceases to record when the specimen is ruptured; the dies in which the specimens are gripped are recessed so that a mark is left on the specimen to indicate whether slipping has occurred, or not. Numerous other advantages of a practical nature are embodied in the machine and the same may be employed for a great variety of purposes.

While I have described the said machine with considerable particularity, I do not intend thereby to limit my invention by such description, but intend that the same be construed only as a full disclosure of an operative embodiment for the purpose of complying with the statutes.

What I claim as new and desire to secure by Letters Patent of the United States is the following:

1. In a testing machine, means to grip a specimen, means to flex said specimen alternately in opposite directions, means for measuring the amount of flexure produced and means for determining the force required to produce said amount of flexure, said flexing means having adjusting means to cause said flexing means to strike a blow upon said specimen before flexing the same.

2. In a testing machine, means to grip a specimen, means to bend said specimen repeatedly, said bending means including a pair of impact jaws, means to cause said impact jaws to strike a blow upon said specimen, upon bending the same, said bending means being provided with means for measuring the amount of bending produced.

3. In a testing machine, means to grip a specimen, means to flex said specimen alternately in opposite directions, said flexing means having means for measuring the amount of flexure produced and having impact jaws separated for striking a blow upon said specimen before flexing the same.

4. In a testing machine, stationary means to grip one end of a specimen, means engaging the other end of the specimen to bend said specimen repeatedly to a predetermined deflection, and means to determine the force necessary to produce said deflection.

5. In a testing machine, stationary means to grip one end of a specimen, means engaging the other end of the specimen to bend said specimen repeatedly to a predetermined deflection, means for measuring the amount of deflection and means to determine the force necessary to produce said deflection.

6. In a test machine, means for holding a test specimen, a base, an open frame mounted on said base, said specimen projecting through said frame, means to impart a reciprocating rectilinear motion to said frame to cause the same to bend said specimen repeatedly, means to measure the stroke of the frame and means to set said frame at the middle of its stroke.

7. In a testing machine, a base, jaws mounted on said base for gripping one end of the test specimen, ways mounted on said base, a slider movable in said ways, impact jaws mounted on said slider, said jaws adapted to engage the free end of said specimen to bend the same, means to impart a reciprocating motion to said slider in said ways and measuring means attached to said slider for determining accurately the stroke of said slider.

8. In combination, a base, a pair of clamping blocks, hardened steel jaws removably secured to said clamping blocks, means to prevent relative movement between said jaws and said clamping block, and means cooperating with said blocks for causing said jaws to engage a test specimen.

9. In combination, a base, a pair of clamping blocks, hardened steel jaws removably secured to said clamping blocks, means secured to said blocks for causing said jaws to engage one end of a test specimen, a sliding frame mounted for rectilinear movement on said base, impact jaws on said frame for engaging the specimen to bend the same and means for determining accurately the stroke of said sliding frame.

10. In combination, a base, gripping means mounted on said base for holding one end of a test specimen, ways mounted on said base, a slider mounted on said ways, said slider comprising a rectangular frame inclosing the free end of said test specimen, a crank, a connecting rod uniting said crank and said slider, means to rotate said crank, means to adjust the throw of said crank to vary the throw of said slider and means engaging the free end of the specimen to bend the same, said means being mounted on said frame.

11. In combination, a base, means mounted on said base for holding a test specimen, a slider mounted on said base, means on said slider for engaging said test specimen, a lever connected to said slider, a weight connected to said lever to move said slider against said test specimen, a rotatable crank, and a connecting rod mounted on said crank and connected to said slider.

12. In combination, a base, means mounted on said base for holding a test specimen, a slider mounted in ways on said base to engage said test specimen, a lever connected to said slider, weighing means connected to said lever to cause said slider to deflect said specimen, a scale mounted on said base, a vernier mounted on said slider adjacent to said scale to measure the deflection of said specimen.

13. In combination, a base, means mounted on said base for holding a test specimen, ways mounted on said base, a slider mounted in said ways for engaging said specimen, means to impart to said slider a reciprocating motion and means independent of said latter means for determining the amount of force required to produce a given deflection of the test specimen.

14. In combination, a base, means mounted on said base for holding a test specimen, ways mounted on said base, a slider mounted in said ways, said slider engaging the free end of said specimen, means for imparting a reciprocating motion to said slider to cause alternate deflection of said specimen, a weighing lever connectable to said slider to determine the amount of force required to produce a given deflection of said specimen.

15. In combination, a base, stationary means mounted on said base for holding one end of a test specimen, ways mounted on said base, a slider mounted on said ways, said slider engaging the free end of said test specimen, a lever connected to said slider, a weight connected to said lever to cause said slider to deflect said specimen, a scale mounted on said base and a vernier mounted on said slider adjacent to said scale to determine the amount of deflection of said specimen.

16. In combination, a base, means for holding a test specimen mounted on said base, ways mounted on said base, a slider in said ways, said slider adapted to engage the test specimen, a crank shaft, a connecting rod for imparting a reciprocating motion to said slider, a standard mounted on said ways, a clamp for engaging a specimen, a lever mounted on said standard and connected to said clamp, a cam on said crank shaft, counting mechanism held in operative engagement by said lever with said cam.

17. In combination, a base, means for gripping a test specimen mounted on said base, rectilinear ways mounted on said base, a slider in said ways, a crank disk mounted for rotation, a crank pin of adjustable throw mounted on said crank disk, a connecting rod between said slider and said crank pin and a setscrew passing through said crank pin and engaging said crank disk.

18. In mechanism of the class described, a crank disk mounted for rotation, a slot cut diametrically across the face of said crank disk, a slide bearing a crank pin mounted in said slot, a slider connected to said crank pin and means to hold a test specimen for engagement with said slider, means to adjust the eccentricity of said crank pin, a set screw passing through said crank pin and engaging said crank disk.

19. In combination, a crank shaft, a crank disk mounted thereon, a T-slot in the surface of said disk, a slide mounted in said slot, a crank pin mounted on said slide, means to adjust the eccentricity of said crank pin, a clamping bolt passing through said crank pin to engage said crank disk and a slider connected to said crank pin for variable throw thereby.

20. In a machine of the class described, a crank shaft bearing a crank disk and having a dove-tailed slot in the surface of said disk, a slide mounted in said slot, a crank pin mounted on said slide, means to adjust said slide, a scale mounted on said disk, a pointer mounted on said slide, a clamping bolt passing through said crank pin and engaging said disk and a slide connected to said crank pin for variable throw thereby.

21. In a machine of the class described, gripping jaws comprising a pair of hardened steel blocks, one of said blocks having a depressed portion with a sharp shoulder to make a definite mark upon the test specimen when the same is gripped.

22. In a machine of the class described, a base, means for gripping a test specimen mounted on said base, a pair of ways, a scale mounted on one of said ways, a sliding member mounted in said ways, a vernier mounted on said sliding member adjacent said scale, a crank shaft bearing a crank, a connecting rod connecting said crank and said sliding member to impart a reciprocating motion to said sliding member, and means to adjust the throw of said crank.

23. In combination, a base, jaws mounted on said base for gripping a test specimen, ways mounted on said base, a slider mounted in said ways, a frame mounted on said slider, adjustable blocks mounted in said frame, impact jaws for engaging said specimen mounted on said blocks, and means for imparting a reciprocating motion to said slider.

24. In combination, a base, jaws mounted on said base for gripping a test specimen, ways mounted on said base, a slider mounted in said ways, a frame member mounted on said slider, said frame member bearing guides, adjustable blocks mounted in said guides, and means to cause said blocks to grip said guides.

25. In combination, a base, jaws mounted on said base for gripping a test specimen, ways mounted on said base, a slider mounted in said ways, a frame member mounted on said slider, said frame member bearing guides, adjustable blocks mounted in said guides, means to cause said blocks to grip said guides, and adjusting screws for moving said blocks on said guides.

26. In combination, a base, jaws for gripping a test specimen mounted on said base, a frame mounted on said slider, adjustable blocks mounted in said frame, micrometer means for determining the position of said blocks, and clamping means for holding said blocks in predetermined position in said frame.

27. In a slider for a test machine, a frame having guides, a pair of blocks mounted on said guides, means to cause said blocks to grip said guides, micrometer means mounted on said frame to adjust the position of said blocks, and hammer jaws mounted on said blocks.

28. In a testing machine, a base, means mounted on said base to grip one end of a test specimen, ways mounted on said base, a slider on said ways for engaging and flexing said specimen, a crank shaft for operating said slider, a cam mounted on said crank shaft, a counter having an operating arm for engaging with said cam and means connected to the test specimen for removing said arm from engagement with said cam upon rupture of the specimen.

29. In a testing machine, a base, a pair of clamping blocks mounted on said base, jaws mounted in said blocks, said jaws having longitudinal grooves therein for holding a test specimen, said jaws having recesses across said grooves, said recesses having sharp edges for making marks upon said specimen, and means for causing said jaws to grip a test specimen.

In witness whereof, I hereunto subscribe my name this 28th day of July, A. D. 1914.

JESSE B. KOMMERS.

Witnesses:
WILLIAM T. KELSEY,
EMIL CADY.

It is hereby certified that in Letters Patent No. 1,163,830, granted December 14, 1915, upon the application of Jesse B. Kommers, of Madison, Wisconsin, for an improvement in "Repeated-Stress-Testing Machines," an error appears in the printed specification requiring correction as follows: Page 5, line 74, claim 20, for the word "slide" read *slider;* and that the said Letters Patent should be read with this correction therein that the same may conform to the record of the case in the Patent Office.

Signed and sealed this 25th day of January, A. D., 1916.

[SEAL.]

R. F. WHITEHAED,

*Acting Commissioner of Patents.*

Cl. 73—51.